United States Patent Office 2,868,770
Patented Jan. 13, 1959

2,868,770

POLYAMIDES OF PARA-AMINOPHENYL ALIPHATIC ACIDS

Samuel C. Temin, Cleveland, Ohio, assignor to Industrial Rayon Corporation, Cleveland, Ohio, a corporation of Delaware No Drawing. Application December 16, 1954
Serial No. 475,809

19 Claims. (Cl. 260—78)

This invention relates to the production of polymeric materials, and more particulary, to the production of certain amino-acid polymers which are capable of being formed into shaped articles such as fibers, filaments, films and the like hereinafter referred to as fibers.

It is well known that condensation polymers may be produced from aliphatic omega-amino acids such as epsilon-amino caproic acid and that shaped articles may be formed from such polymers. Moreover, much data is available concerning polymers made from these completely aliphatic amino acids, and thus, the properties of polymers made from particular acids of this series can reasonably be predicted. However, very little is known concerning polymers of aromatic omega-amino acids and nothing as to the particular polymers of the para-aminophenyl aliphatic acids of the present invention.

In accordance with the present invention, a linear polyamide suitable for the production of shaped articles may be prepared by a process which comprises heating a compound selected from the group consisting of (A) acids having the formula

wherein Y is a radical selected from the group consisting of branched chain alkylene radicals having two to six carbon atoms and unbranched chain alkylene radicals having three to six carbon atoms, and (B) amide-forming derivatives of such acids. Y in the formula above may be a branched or unbranched radical and advantageously, may contain four to five carbon atoms in the radical.

The monomeric para-aminophenyl aliphatic acids employed in producing the polymers of the present invention may be prepared by a number of methods. One method of synthesis involves the condensation of acetanilide or a similar derivative of aniline with an acid anhydride to yield a para-amino benzoyl aliphatic acid. This product is then cleaved to the free amino compound and reduced to the para-aminophenyl aliphatic acid. A second method consists in condensing benzene with an unsaturated, halogen-substituted or hydroxy-substituted aliphatic carboxylic acid or derivative thereof in a typical Friedel-Crafts reaction. The phenyl-aliphatic acid formed is nitrated to yield a paranitro derivative which is reduced to the para-aminophenyl aliphatic acid. A third method of synthesis is similar to the second method but utilizes a halobenzene in place of the benzene. The para-halophenyl aliphatic acid produced is then treated with aqueous ammonia under pressure and at an elevated temperature to yield the para-aminophenyl aliphatic acid.

The aliphatic reactant employed in the Friedel-Crafts reactions described above may also be of such a nature as to yield an intermediate from which a carboxylic acid results on treatment. Thus, for example, the Friedel-Crafts reaction may yield a phenyl or halophenyl aliphatic methyl ketone having the formula

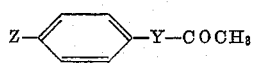

wherein Z is hydrogen, chlorine, or bromine. A ketone of this type can then be converted to a carboxylic acid by haloform oxidation, Willgerodt reaction, etc.

In general, the members of the para-aminophenyl aliphatic acid series particularly useful for the purposes of the present invention are those in which Y of the formula

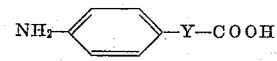

is as follows:

Unbranched radicals—

wherein $x=3, 4, 5$ or $6$

Branched radicals—

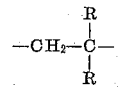

and

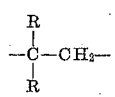

and

and

wherein R=methyl or ethyl.

Especially advantageous for the purposes of the present invention are the following compounds:

4-(para-aminophenyl)butyric acid
2-(para-aminophenyl)isobutyric acid
5-(para-aminophenyl)valeric acid
3-(para-aminophenyl)isovaleric acid
4-(para-aminophenyl)isocaproic acid The para-aminophenyl aliphatic acid monomers of the present invention may be polymerized by heating to the temperature at which condensation occurs. Advantageously, the temperature of polymerization is between about 150° and 300° C. The amino-acid monomers, with advantage, may be heated in a suitable inert solvent such as, for example, cresol, phenol, xylenol and the like. Preferably, the polymerization is performed in an oxygen-free atmosphere such as nitrogen or other inert gases. In polymerizing the amino-acid monomers of the present invention, it is advantageous to perform the latter part of the polymerization at a subatmospheric pressure to facilitate the elimination of the by-products, e. g., water, of the condensation reaction from the viscous partially formed polymer. When the polymerization is performed without any solvent being present, it is desirable to heat the monomers to a sufficiently elevated temperature to maintain the reaction mixture in a fluid state during the polymerization. The polyamides of the present invention on hydrolysis yield the amino-acid monomeric reactants.

As stated above, the para-aminophenyl aliphatic acids may be polymerized in their free acid state. In addition, the monomeric acids also may be polymerized in the form of derivatives of the acids such as, for example, the amide, ester or other derivatives in which the carboxyl group reacts with an amino group. Likewise, the amino group of the para-aminophenyl aliphatic acid may be present in the form of an acid derivative of such nature that the acid radical is readily split off during the heating step.

In addition to the self-condensation of the para-aminophenyl aliphatic acids of the present invention, the monomers also may be condensed with other polyamide-forming reactants. For example, the amino-acid monomer may be condensed with a completely aliphatic amino acid such as epsilon-amino caproic acid or a derivative thereof such as epsilon-caprolactam. Also, the amino-acid monomer of the present invention may be condensed with a mixture containing equimolecular proportions of a diamine and a dicarboxylic acid such as a mixture of hexamethylene diamine and adipic acid. Further, one member of the para-aminophenyl aliphatic acid series may be copolymerized with another. By condensing the monomers of the present invention with other polyamide-forming reactants, it is possible to obtain a series of polyamides having widely varying melting points, etc.

The polymers of the present invention may be extruded by melt spinning methods to form fibers, filaments, films and the like having properties different from those of polyamides prepared from aliphatic omega-amino acids. For example, some of the polymers of the present invention have a higher initial modulus of elasticity, a higher "glass" or second order transition temperature, and a greater stiffness and resiliency in addition to the excellent abrasion resistance which characterizes polyamides in general. If desired, plasticizers, e. g., phenol, etc., may be combined with the polymer prior to melt spinning so as to permit lower extrusion temperatures.

This invention will be more fully described by the following examples, although, it is understood that the invention is not intended to be limited by these examples. In these examples "parts" and "percent" of materials is intended to mean parts and percent by weight.

*Example I*

Ten parts of 5-(para-aminophenyl)valeric acid and three parts of xylenol are heated together at about 250–255° C. in a vessel squipped with an outlet tube and an inlet capillary tube through which oxygen-free nitrogen is passed. After heating for six hours at this temperature, a vacuum is applied by means of the outlet tube and the contents of the vessel are heated for four hours at about 275° C. under a pressure of about 0.1 mm. of mercury absolute pressure during which time all of the xylenol is removed. The resulting polymer is withdrawn from the vessel and cooled. The product is a white, tough, crystalline solid. The polymer is placed in a stainless steel vessel, heated to about 290° C. and extruded under a nitrogen pressure of about 200 p. s. i. through a small orifice to form filaments which are then stretched at 130° C. between godets to four and one-half times their original length. These filaments show high tenacity and high initial modulus of elasticity.

The para-aminophenylvaleric acid employed in this example is prepared by the following method. Cinnamaldehyde is condensed with acetone to yield cinnamalacetone in excellent yield. This product is subjected to hypochlorite oxidation to produce styrylacrylic acid which is hydrogenated to 5-phenylvaleric acid. The phenylvaleric acid is then nitrated using fuming nitric acid at low temperatures to yield 5-(para-nitrophenyl)valeric acid which is reduced over Raney nickel to 5-(para-aminophenyl)valeric acid.

*Example II*

Eight parts of 4-(para-aminophenyl)butyric acid and two parts of caprolactam are mixed and placed in a vessel equipped with a gas inlet tube and an outlet tube for applying vacuum. By means of the gas inlet tube, an atmosphere of carbon dioxide is maintained in the vessel. The contents are heated at about 275° C. for a period of four and one-half hours. Then, while maintaining this temperature, the pressure in the vessel is lowered to about 1 mm. of mercury absolute pressure over a period of one hour and the heating continued at this pressure for an additional one-half hour. The copolymer obtained in this manner is a tough, white solid with a melting point of 250° C. It can be extruded according to the procedure of Example I to form fibers which can be drawn to yield products of high tenacity.

*Example III*

Twelve parts of 4-(para-aminophenyl)isocaproic acid is heated in a stainless steel vessel at about 200° C. under a nitrogen atmosphere for one hour. The temperature is then raised to about 250° C. for four hours. While maintaining this temperature, the pressure in the vessel is lowered to about 1 mm. of mercury absolute pressure for an additional hour. The polymer formed, having a melting point of 225–230° C., is then extruded while still molten from the vessel under nitrogen pressure to yield fibers that can be cold drawn.

*Example IV*

Ten parts of 3-(para-aminophenyl)isovaleric acid is heated at about 250° C. in a vessel equipped with an outlet tube. After three hours, the temperature is slowly raised to about 280° C. while a vacuum is applied at the outlet tube and the pressure slowly lowered to about 0.5 mm. of mercury absolute pressure. After heating for eight hours under these conditions, the polymer is withdrawn from the vessel and cooled. The product is a white tough solid with a melting point of 235–240° C.

This solid is broken into chips and placed in a stainless steel vessel where it is heated to about 250° C. while under nitrogen pressure. From this vessel, it is extruded to form a film having high tenacity and good transparency. The film remains amorphous even after being heated at 150° C. for several hours.

The para-aminophenylisovaleric acid employed in this example is obtained by the following general method: Mesityl oxide is condensed with benzene in a Friedel-Crafts reaction and the product subjected to hypochlorite oxidation to produce phenylisovaleric acid. A sulfuric acid solution of phenylisovaleric acid is reacted with nitric acid to produce para-nitrophenylisovaleric acid which is reduced to the para-aminophenylisovaleric acid employed in the above example.

I claim:

1. A process for preparing a linear polyamide suitable for the production of shaped articles which comprises heating to a temperature between about 150° and 300° C. a polycarbonamide-forming compound of the formula

wherein Y is a radical selected from the group consisting of branched chain alkylene radicals having two to six carbon atoms and unbranched chain alkylene radicals having three to six carbon atoms, Z is a radical selected from the group consisting of an amino group and a nitrogen-containing radical readily split to leave on the ring an amino group, and X is a radical selected from the group consisting of a carboxyl group and the esters and amides thereof.

2. A process for preparing a linear polyamide suitable for the production of shaped articles which comprises heating to a temperature between about 150° and 300° C. in an inert atmosphere a polycarbonamide-forming compound of the formula

wherein Y is a radical selected from the group consisting of branched chain alkylene radicals having two to six carbon atoms and unbranched chain alkylene radicals having three to six carbon atoms, Z is a radical selected from the group consisting of an amino group and a nitrogen-containing radical readily split to leave on the ring an amino group, and X is a radical selected from the group consisting of a carboxyl group and the esters and amides thereof.

3. A process for preparing a linear polyamide suitable for the production of shaped articles which comprises heating to a temperature between about 150° and 300° C. in the presence of a polyamide solvent a polycarbonamide-forming compound of the formula

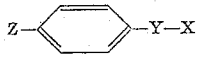

wherein Y is a radical selected from the group consisting of branched chain alkylene radicals having two to six carbon atoms and unbranched chain alkylene radicals having three to six carbon atoms, Z is a radical selected from the group consisting of an amino group and a nitrogen-containing radical readily split to leave on the ring an amino group, and X is a radical selected from the group consisting of a carboxyl group and the esters and amides thereof.

4. A process for preparing a linear polyamide suitable for the production of shaped articles which comprises heating to a temperature between about 150° and 300° C. a polycarbonamide forming compound of the formula

wherein Y is a radical selected from the group consisting of branched chain alkylene radicals having two to six carbon atoms and unbranched chain alkylene radicals having three to six carbon atoms, Z is a radical selected from the group consisting of an amino group and a nitrogen-containing radical readily split to leave on the ring an amino group, and X is a radical selected from the group consisting of a carboxyl group and the esters and amides thereof, to produce a partially formed polymer; and continuing the heating of said partially formed polymer at a subatmospheric pressure.

5. A process for preparing a linear polyamide suitable for the production of shaped articles which comprises heating to a temperature between about 150° and 300° C. a polycarbonamide-forming compound having the formula

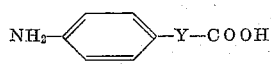

wherein Y is a radical selected from the group consisting of branched chain alkylene radicals having two to six carbon atoms and unbranched chain alkylene radicals having three to six carbon atoms.

6. A process for preparing a linear polyamide according to claim 5 in which the compound is 4-(para-aminophenyl)butyric acid.

7. A process for preparing a linear polyamide according to claim 5 in which the compound is 6-(para-aminophenyl)caproic acid.

8. A process for preparing a linear polyamide according to claim 5 in which the compound is 5-(para-aminophenyl)valeric acid.

9. A process for preparing a linear polyamide according to claim 5 in which the compound is 3-(para-aminophenyl)isovaleric acid.

10. A process for preparing a linear polyamide according to claim 5 in which the compound is 4-(para-aminophenyl)isocaproic acid.

11. A linear polyamide suitable for the production of shaped articles which yields on hydrolysis a product consisting essentially of acids having the formula

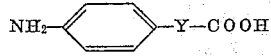

wherein Y is a radical selected from the group consisting of branched chain alkylene radicals having two to six carbon atoms and unbranched chain alkylene radicals having three to six carbon atoms.

12. A linear polyamide according to claim 9 in which the acid is 4-(para-aminophenyl)butyric acid.

13. A linear polyamide according to claim 9 in which the acid is 6-(para-aminophenyl)caproic acid.

14. A linear polyamide according to claim 11 in which the acid is 5-(para-aminophenyl)valeric acid.

15. A linear polyamide according to claim 11 in which the acid is 3-(para-aminophenyl)isovaleric acid.

16. A linear polyamide according to claim 11 in which the acid is 4-(para-aminophenyl)isocaproic acid.

17. A linear polyamide suitable for the production of shaped articles which yields on hydrolysis a product consisting essentially of acids having the formula

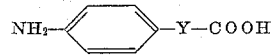

wherein Y is a radical selected from the group consisting of branched chain alkylene radicals having two to six carbon atoms and unbranched chain alkylene radicals having three to six carbon atoms, and minor amounts of epsilonamino caproic acid.

18. A process for preparing a linear polyamide suitable for the production of shaped articles which comprises heating to a temperature between about 150° and 300° C. a compound selected from the group consisting of epsilon-amino caproic acid and epsilon-caprolactam, and a polycarbonamide-forming compound of the formula

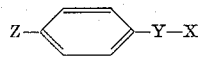

wherein Y is a radical selected from the group consisting of branched chain alkylene radicals having two to six carbon atoms and unbranched chain alkylene radicals having three to six carbon atoms, Z is a radical selected from the group consisting of an amino group and a nitrogen-containing radical readily split to leave on the ring an amino group, and X is a radical selected from the group consisting of a carboxyl group and the esters and amides thereof.

19. A process for preparing a linear polyamide suitable for the production of shaped articles which comprises heating to a temperature between about 150° and 300° C. epsilon-caprolactam and a polycarbonamide-forming compound of the formula

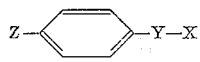

wherein Y is a radical selected from the group consisting of branched chain alkylene radicals having two to six carbon atoms and unbranched chain alkylene radicals having three to six carbon atoms, Z is a radical selected from the group consisting of an amino group and a nitrogen-containing radical readily split to leave on the ring and amino group, and X is a radical selected from the group consisting of a carboxyl group and the esters and amides thereof.

References Cited in the file of this patent

UNITED STATES PATENTS

| 2,071,253 | Carothers | Feb. 16, 1937 |
| 2,245,129 | Greenewalt | June 10, 1941 |
| 2,361,717 | Taylor | Oct. 31, 1944 |

OTHER REFERENCES

Beilstein: Handbuch der organ. chemie, 4th ed., volume 14; page 491.

Webster's "New International Dictionary," page 1317, 2nd edition, G. & C. Merriam Co., publishers, Springfield, Mass., 1956.